United States Patent
Kishihara et al.

(10) Patent No.: US 9,400,026 B2
(45) Date of Patent: Jul. 26, 2016

(54) SPIRAL SPRING

(71) Applicants: SUNCALL CORPORATION, Kyoto-shi (JP); TOYOTA JIDOSHA KABUSHIKI KAISHA, Toyota-shi (JP); DENSO CORPORATION, Kariya-shi (JP)

(72) Inventors: Ryuji Kishihara, Kyoto (JP); Naoya Wada, Kyoto (JP); Keiichiro Teratoko, Kyoto (JP); Akio Kidooka, Toyoto (JP); Yuu Yokoyama, Toyoto (JP); Akira Hori, Kariya (JP)

(73) Assignees: Suncall Corporation, Kyoto-Shi (JP); Toyota Jidosha Kabushiki Kaisha, Aichi (JP); Denso Corporation, Aichi (JP)

( * ) Notice: Subject to any disclaimer, the term of this patent is extended or adjusted under 35 U.S.C. 154(b) by 0 days.

(21) Appl. No.: 14/436,802

(22) PCT Filed: Nov. 20, 2013

(86) PCT No.: PCT/JP2013/081240
§ 371 (c)(1),
(2) Date: Apr. 17, 2015

(87) PCT Pub. No.: WO2014/091892
PCT Pub. Date: Jun. 19, 2014

(65) Prior Publication Data
US 2015/0292585 A1 Oct. 15, 2015

(30) Foreign Application Priority Data
Dec. 13, 2012 (JP) .................. 2012-271863

(51) Int. Cl.
F16F 1/10 (2006.01)
F01L 1/356 (2006.01)
F01L 1/344 (2006.01)

(52) U.S. Cl.
CPC . *F16F 1/10* (2013.01); *F01L 1/356* (2013.01); *F01L 2001/34483* (2013.01); *F16F 2234/06* (2013.01); *F16F 2238/026* (2013.01)

(58) Field of Classification Search
CPC ... F16F 1/10; F16F 2234/06; F16F 2238/026; F16F 1/356; F16F 2001/34483
USPC .............. 267/156, 37.2, 199, 272; 123/90.12, 123/90.15, 90.17
See application file for complete search history.

(56) References Cited

U.S. PATENT DOCUMENTS

| 8,656,876 B2 * | 2/2014 | Fujiyoshi | .............. | F01L 1/3442 123/90.15 |
| 2010/0199937 A1 * | 8/2010 | Fujiyoshi | .............. | F01L 1/3442 123/90.17 |

(Continued)

FOREIGN PATENT DOCUMENTS

| JP | 2010-180862 | 8/2010 |
| JP | 2013-092098 | 5/2013 |

OTHER PUBLICATIONS

Notification of Transmittal of Translation of the International Preliminary Report on Patentability (Chapter I or II) based on International Application No. PCT/JP2013/081240 mailed Jun. 25, 2015.

(Continued)

*Primary Examiner* — Pamela Rodriguez
(74) *Attorney, Agent, or Firm* — Sterne, Kessler, Goldstein & Fox P.L.L.C.

(57) ABSTRACT

At least a first movable coil part of a plurality of movable coil parts that is in the innermost place in the radial direction does not come into contact with both the fixed coil part, which is radially adjacent inwardly, and a second movable coil part, which is radially adjacent outwardly, at the same place in the circumferential direction while coming into contact with only one of the fixed coil part and the second movable coil part in a plurality of places that are circumferentially displaced, when the spiral spring is in an elasticity retaining state reached from a free length state by elastic deformation in the diameter-reducing direction.

4 Claims, 6 Drawing Sheets

(56) References Cited

U.S. PATENT DOCUMENTS

| | | | | |
|---|---|---|---|---|
| 2011/0073055 A1* | 3/2011 | Kobayashi | ............ | F01L 1/3442 123/90.17 |
| 2011/0073056 A1* | 3/2011 | Kobayashi | ............ | F01L 1/3442 123/90.17 |
| 2013/0036992 A1* | 2/2013 | Iwai | ......................... | F01L 9/02 123/90.12 |
| 2013/0098320 A1* | 4/2013 | Matsunaga | ............. | F01L 1/344 123/90.12 |

OTHER PUBLICATIONS

International Search Report based on PCT/JP2013/081240 mailed on Dec. 24, 2013.

* cited by examiner

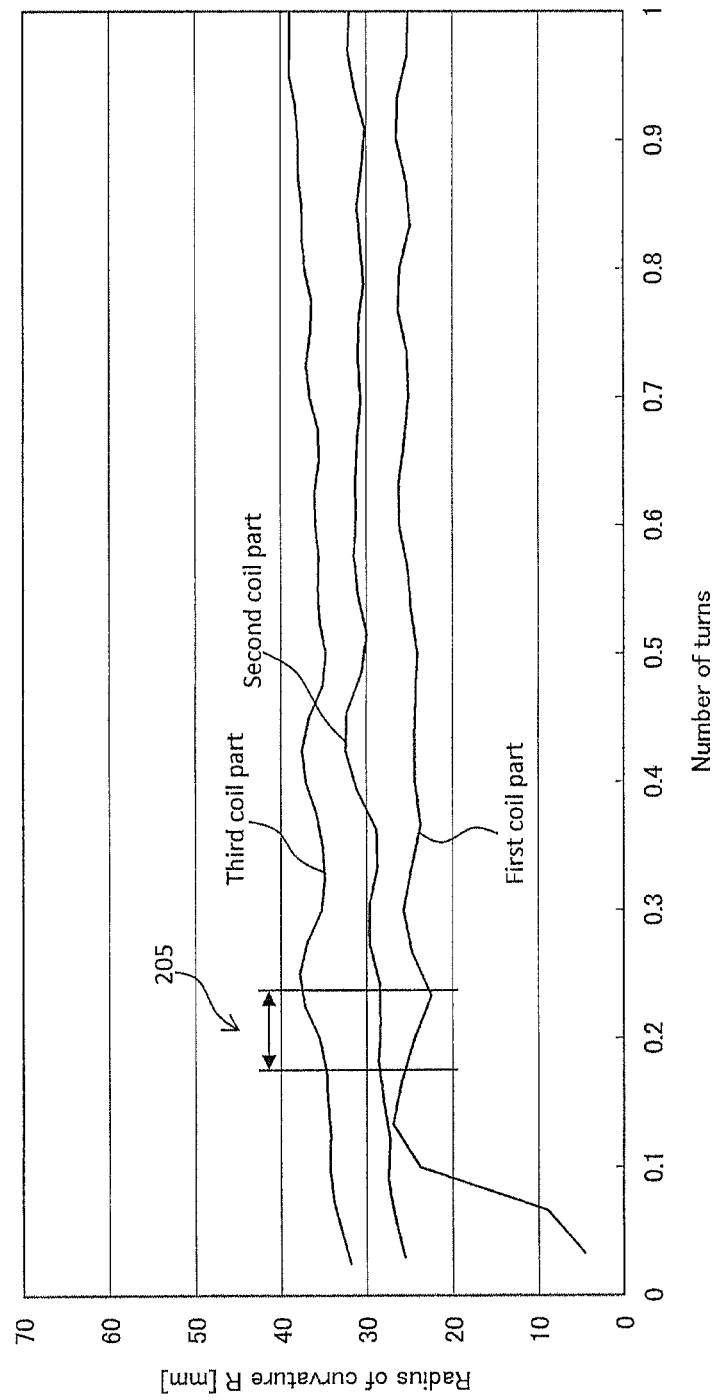

SPIRAL SPRING

BACKGROUND OF THE INVENTION

1. Field of the Invention

The present invention relates to a spiral spring.

2. Background Art

Spiral springs are widely used in various applications such as a valve timing adjuster for rotationally driving a cam shaft by rotative power inputted from the crankshaft in an internal combustion engine.

The valve timing adjuster includes a housing operatively connected to the crankshaft and a vane rotor operatively connected to the cam shaft, the internal space of the housing is divided into a retard chamber and an advance chamber by vanes in the vane rotor, and supplying hydraulic oil to one of the retard chamber and the advance chamber and discharging hydraulic oil from the other make it possible to change the rotational phase of the vane rotor relative to the housing.

The valve timing adjuster further includes a spiral spring for enhancing the startability of an internal combustion engine by retaining the rotational phase of the vane rotor relative to the housing at an intermediate phase between the most retarded position and the most advanced position.

The spiral spring is interposed between the housing and the vane rotor so as to he capable of biasing the vane rotor toward the intermediate phase on the advance side when the vane rotor is placed more toward the retard side than the intermediate phase is, and thereby the rotational movement of the vane rotor at the start of the internal combustion engine is retained at the intermediate phase so that the startability of the internal combustion engine can be enhanced.

The spiral spring is a member obtained by spirally winding an elongated wire rod in approximately the same plane and arrives at an elasticity retaining state by the relative circumferential movement of the inner end and the outer end in the diameter-reducing direction.

FIGS. 4A to 4C show plan views of a conventional spiral spring.

FIGS. 4A to 4C show a free length state, an initial torque generating state (a state in which the spiral spring is elastically deformed in the diameter-reducing direction from the free length state so as to generate a predetermined initial torque), and a maximum torque generating state (a state in which the spiral spring is elastically deformed in the diameter-reducing direction from the initial torque generating state so as to generate the maximum torque) of the spiral spring, respectively.

As shown in FIG. 4A, in a free length state, a conventional spiral spring is configured such that the radius of curvature is increased at an approximately constant rate from the inner end that is located radially inside toward the outer end that is located radially outside (the radius is increased at an approximately constant rate).

As shown in FIGS. 4B and 4C, when a conventional spiral spring having this configuration is brought into an elasticity retaining state such as the initial torque generating state or the maximum torque generating state, all coil parts ranging from the first coil part in the innermost place to the n-th coil part in the outermost place in the radial direction (the third coil part in the configuration depicted in the drawings) come into contact with other radially adjacent coil parts only in one location that is approximately the same position with respect to the circumferential direction (hereinafter referred to as a first circumferential position).

That is, in the aforementioned conventional spiral spring, the entire areas in the circumferential direction of all coil parts except in the first circumferential position are not subjected to frictional contact with other coil parts that are radially adjacent, and thus are areas where elastic deformation can freely occur. Accordingly, there is a problem in that the overall natural frequency of the spiral spring is low.

When such a conventional spiral spring is used in, for example, a valve timing adjuster disclosed in patent literature 1, resonance occurs as the output rotational speed of an internal combustion engine increases and the frequency of vibrations added to the spiral spring nears the natural frequency, thus imposing a large burden on the spiral spring.

Moreover, the coil part located in the middle with respect to the radial direction comes into contact with and is compressed by the coil part that is located radially inside and the coil part that is located radially outside in the first circumferential position, thus stress is concentrated on the first circumferential position at the time of elastic deformation movement, and there is a possibility of this part being damaged.

PRIOR ART DOCUMENT

Patent Document

Patent document 1: Japanese Unexamined Patent Publication No. 2010-180862.

DISCLOSURE OF THE INVENTION

The present invention has been achieved in view of the conventional art described above, and an object thereof is to provide a spiral spring capable of having an increased natural frequency and preventing or reducing local stress concentration at the time of elastic deformation movement.

In order to achieve the object, the present invention provides a spiral spring in which an elongated member is wound into a spiral shape in substantially the same plane so as to have a fixed coil part serving as an end coil part and a plurality of movable coil parts being continuous with a terminal end of the fixed coil part, wherein at least a first movable coil part of the plurality of movable coil parts that is in the innermost place in the radial direction does not come into contact with both the fixed coil part, which is radially adjacent on the inside, and a second movable coil part, which is radially adjacent on the outside, at the same place in the circumferential direction while coming into contact with only one of the fixed coil part and the second movable coil part in a plurality of places that are circumferentially displaced, when the spiral spring is in an elasticity retaining state reached from a free length state by elastic deformation in the diameter-reducing direction.

The spiral spring according to the present invention makes it possible to effectively increase the natural frequency while effectively preventing local stress concentration at the time of elastic deformation movement in comparison with a conventional spiral spring in which one coil part comes into contact with another one coil part, which is radially adjacent on the inside, and still another one coil part, which is radially adjacent on the outside, at the same place in the circumferential direction, since at least the first movable coil part of the plurality of movable coil parts that is in the innermost place in the radial direction does not come into contact with both the fixed coil part, which is radially adjacent on the inside, and the second movable coil part, which is radially adjacent on the outside, at the same place in the circumferential direction while coming into contact with only one of the fixed coil part and the second movable coil part in a plurality of places that are circumferentially displaced, when the spiral spring is in an elasticity retaining state reached from a free length state by elastic deformation in the diameter-reducing direction.

In one embodiment, the first movable coil part has a plurality of small curvature parts with a smaller radius of curvature than both sides in the circumferential direction, the second movable coil part has a plurality of large curvature parts that are arranged in places respectively corresponding to the plurality of small curvature parts with respect to the circumferential direction and each have a larger radius of curvature than both sides in the circumferential direction, and the plurality of small curvature parts come into contact with the corresponding large curvature parts, respectively when the spiral spring is in the elasticity retaining state.

For example, the plurality of small curvature parts includes a first small curvature part arranged in a place circumferentially spaced from the terminal end of the fixed coil part, a second small curvature part arranged in a place circumferentially spaced from the first small curvature part, and a third small curvature part arranged in a place circumferentially spaced from the second small curvature part, and the plurality of large curvature parts includes first to third large curvature parts that are arranged in places respectively corresponding to the first to third small curvature parts with respect to the circumferential direction, respectively.

In a preferred configuration, the first movable coil part includes a halfway portion that is arranged between the second and third small curvature parts with respect to the circumferential direction and comes in contact with the fixed coil part while leaving a gap between the halfway portion and the second movable coil part, when the spiral spring is in the elasticity retaining state.

BRIEF DESCRIPTION OF THE DRAWINGS

FIG. 6 is a graph showing a relationship between the number of turns and the curvature of the conventional spiral spring shown in FIGS. 4A to 4C at the maximum torque generating state.

EMBODIMENT FOR CARRYING OUT THE INVENTION

Below, a preferable embodiment of the spiral spring according to the present invention is described with reference to the appended drawings.

Figure 1:
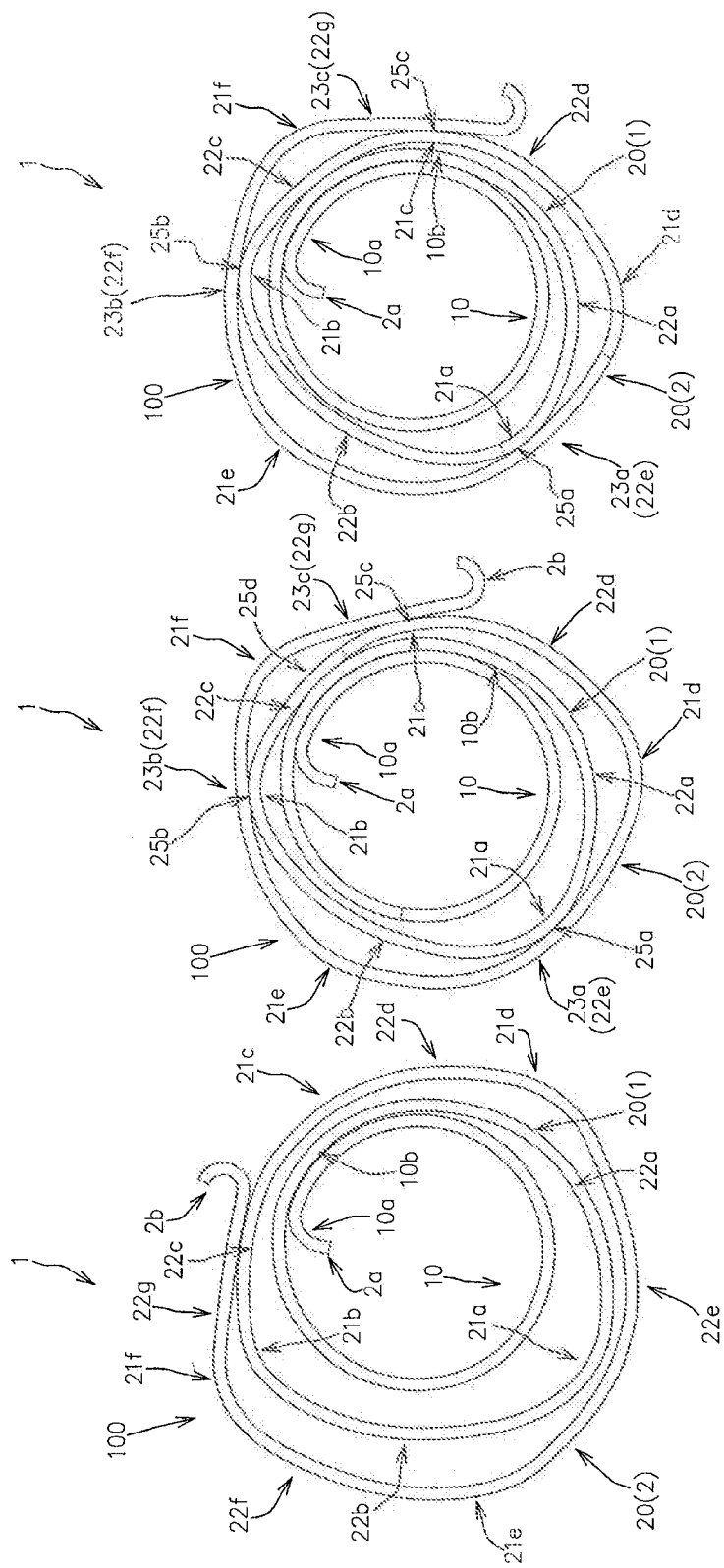
FIGS. 1A to 1C are plan views of a spiral spring according to one embodiment of the present invention, and show a free length state, an initial torque generating state and a maximum torque generating state, respectively.

FIGS. 1A to 1C show plan views of a spiral spring 1 according to the present embodiment.

FIGS. 1A to 1C show a free length state, an initial torque generating state (a state in which the spiral spring 1 is elastically deformed in the diameter-reducing direction front the free length state so as to generate a predetermined initial torque), and a maximum torque generating state (a state in which the spiral spring 1 is elastically deformed in the diameter-reducing direction front the initial torque generating state so as to generate the maximum torque) of the spiral spring 1, respectively As shown in FIGS. 1A to 1C, due to the spiral winding of an elongated member 100 in substantially the same plane, the spiral spring 1 has a fixed coil part 10 that is in the innermost place in the radial direction and serves as an end coil part, and a plurality of movable coil parts 20 that are continuous with the terminal end of the fixed coil part 10.

The fixed coil part 10 has one end 10a on the starting end side that forms the inner end of the spiral spring 1 and the other end 10b that spirally extends from the one end 10a and forms the terminal end that continues to the movable coil parts 20.

In the configuration depicted in the drawings, the area covering approximately 1.25 turns from the inner end of the spiral spring 1 serves as the fixed coil part 10. At the inner end of the spiral spring 1 (the starting end of the fixed coil part), an inner end side attachment hook 2a is formed.

The plurality of movable coil parts 20 have a first movable coil part 20(1) that extends from the terminal end 10b of the fixed coil part 10 so as to be located radially outside of the fixed coil part 10, and a second movable coil part 20(2) that extends from the terminal end of the first movable coil part 20(1) so as to be located radially outside of the first movable coil part 20(1).

As shown in FIGS. 1A to 1C, in the spiral spring 1 according to the present embodiment, the terminal end of the second movable coil part 20(2) forms the outer end of the spiral spring 1, and an outer end side attachment hook 2b is formed at the outer end (the terminal end of the second movable coil part 20(2)). The present invention is not limited to this embodiment, and is naturally possible that the movable parts include three or more coil parts.

The spiral spring 1 according to the present embodiment is configured such that when an elasticity retaining state (the state shown in FIGS. 1B and 1C) is reached from a free length state (the state shown in FIG. 1A) by elastic deformation in the diameter-reducing direction, the first movable coil part 20(1) does not come into contact with both the fixed coil part 10, which is radially adjacent on the inside, and the second movable coil part 20(2), which is radially adjacent on the outside, at the same place in the circumferential direction, and comes into contact with only one of the fixed coil part 10 and the second movable coil part 20(2) in a plurality of places that are circumferentially displaced.

Specifically, as shown in FIGS. 1B and 1C, in the elasticity retaining state, the first movable coil part 20(1) is in contact with only the second movable coil part 20(2) in a first place 25a that is spaced from the starting end at a predetermined angle in the circumferentially outward direction while being radially spaced from the fixed coil part 10, is in contact with only the second movable coil part 20(2) in a second place 25b that is spaced from the first place 25a at a predetermined angle in the circumferentially outward direction while being radially spaced from the fixed coil part 10, and is in contact with only the second movable coil part 20(2) in a third place 25c that is spaced from the second place 25b at a predetermined angle in the circumferentially outward direction while being radially spaced from the fixed coil part 10.

In the present embodiment, when the spiral spring 1 is in the elasticity retaining state, the first movable coil part 20(1) is, further, in contact with only the fixed coil part 10 in a fourth place 25d that is between the second place 25b and the third place 25c with respect to the circumferential direction while being radially spaced from the second movable coil part 20(2).

Thus, in the present embodiment, in the elasticity retaining state, the first movable coil part 20(1) is not in contact with both the fixed coil part 10 and the second movable coil part 20(2) in the same place in the circumferential direction, and is in contact with only one of the fixed coil part 10 and the second movable coil part 20(2) in a plurality of places that are circumferentially displaced.

The thus configured spiral spring 1 according to the present embodiment can have a higher natural frequency than conventional spiral springs, and, moreover, can effectively prevent local stress concentration.

Figure 4C:
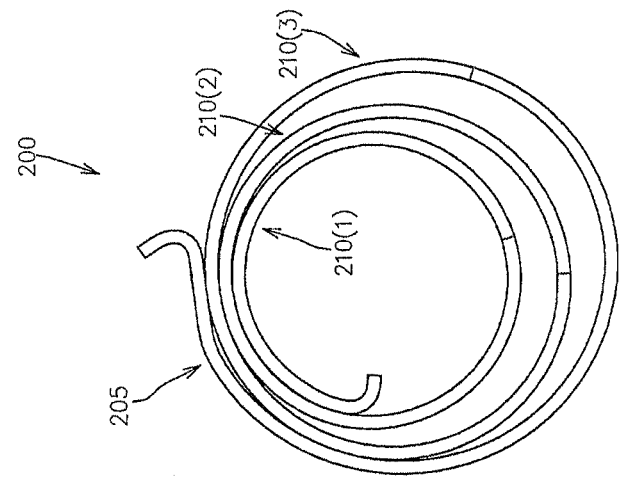
FIGS. 4A to 4C are plan views of a conventional spiral spring, and show a free length state, an initial torque generating state and a maximum torque generating state, respectively.
Figure 4B:
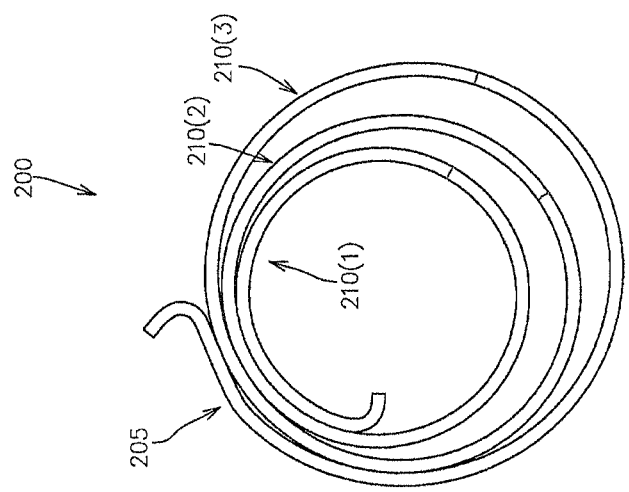
Figure 4A:
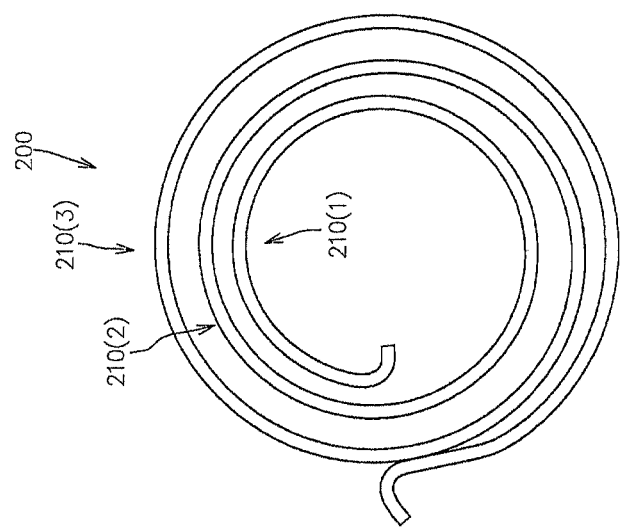

FIGS. 4A to 4C show plan views of a conventional spiral spring 200 in a free length state, an initial torque generating state, and a maximum torque generating state, respectively.

Figure 5:
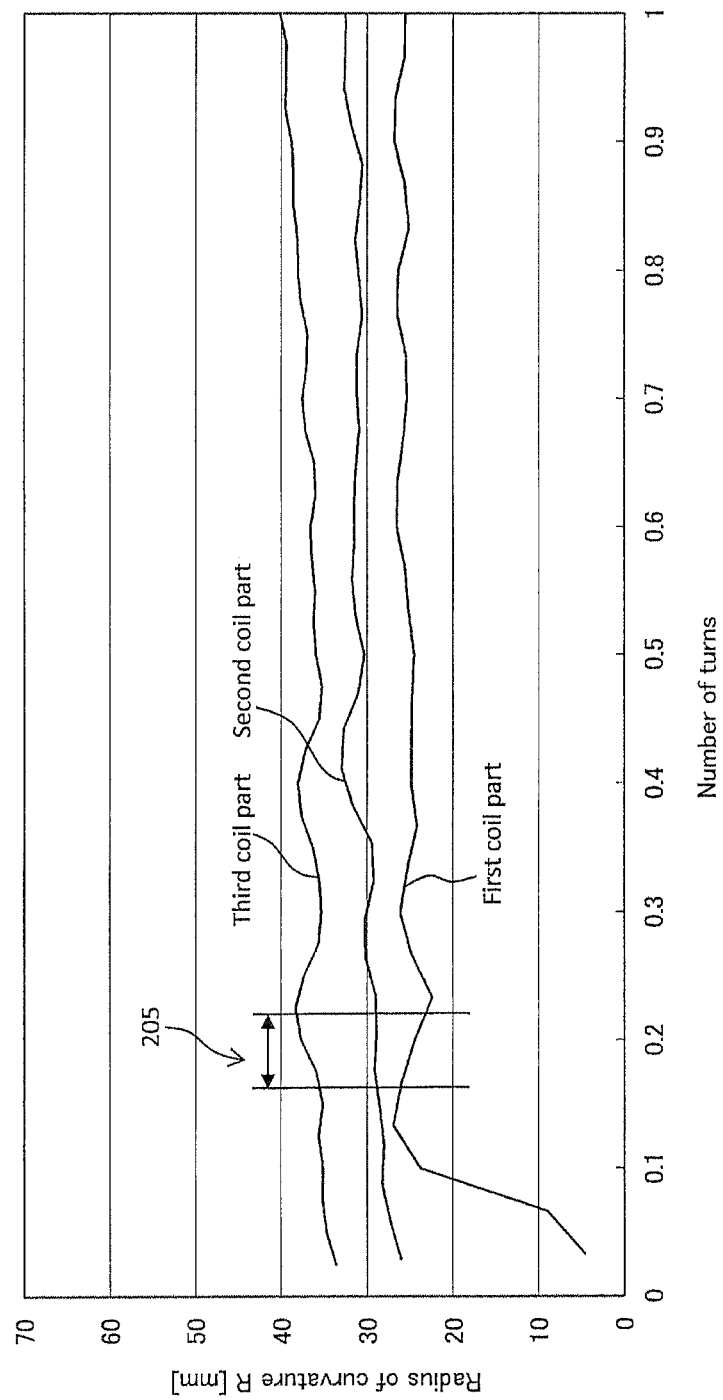
FIG. 5 is a graph showing a relationship between the number of turns and the curvature of the conventional spiral spring shown in FIGS. 4A to 4C at the initial torque generating state.

FIG. 5 shows the relationship between the number of turns and the curvature when the conventional spiral spring 200 is in an initial torque generating state (FIG. 4B). FIG. 6 shows the relationship between the number of turns and the curvature when the conventional spiral spring 200 is in a maximum torque generating state (FIG. 4C).

As shown in FIG. 4A, in a free length state, the conventional spiral spring 200 is configured such that the radius of curvature is increased at an approximately constant rate from the inner end that is located radially inside toward the outer end that is located radially outside (the radius is increased at an approximately constant rate).

As shown in FIGS. 4B and 4C, when the conventional spiral spring 200 having this configuration is brought into an elasticity retaining state such as the initial torque generating state or the maximum torque generating state, all coil parts ranging from a first coil part 210(1) in the innermost place to a third coil part 210(3) in the outermost place in the radial direction come into contact with other radially adjacent coil parts only in one location that is approximately the same position with respect to the circumferential direction (hereinafter referred to as a first circumferential position 205).

In this case, in every one of all coil parts, the entire area in the circumferential direction except at the first circumferential position 205 is not subjected to frictional contact with other radially adjacent coil parts, and thus is an area where elastic deformation can freely occur. Accordingly, the overall natural frequency of the spiral spring is lowered, and resonance is likely to occur.

Moreover, in the conventional configuration, the coil part located in the middle with respect to the radial direction (the second coil part 210(2) in the configuration depicted in the drawings) is compressed by the coil part (210(1)) located radially inside and the coil part (210(3)) located radially outside in the first circumferential position 205, and thus there is a problem in that stress is concentrated on the first circumferential position 205 at the time of elastic deformation movement.

On the other hand, in the spiral spring 1 according to the present embodiment, the first movable coil part 20(1) contact only one of the fixed coil part 10 and the second movable coil part 20(2) in a plurality of places 25a, 25b, and 25c that are circumferentially displaced. Accordingly, it is possible to increase the natural frequency and thus effectively prevent resonance.

Moreover, the first movable coil part 20(1) is configured so as not to be simultaneously in contact with both the fixed coil part and the second movable coil part in the same place in the circumferential direction. Accordingly, it is possible to effectively prevent stress concentration on a specific location at the time of elastic deformation movement.

Figure 2:
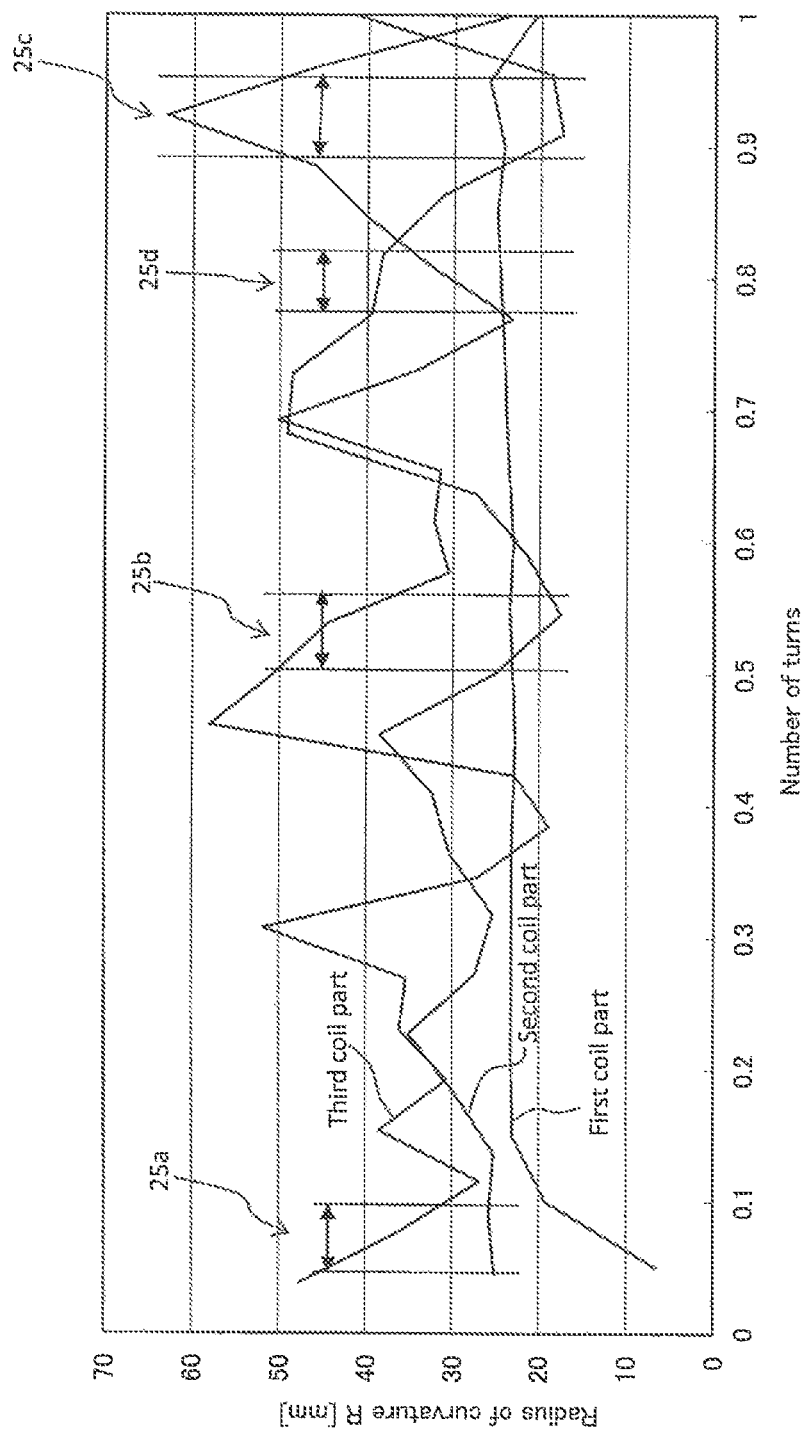
FIG. 2 is a graph showing a relationship between the number of turns and the curvature when the spiral spring shown in FIGS. 1A to 1C is in an initial torque generating state.
Figure 3:
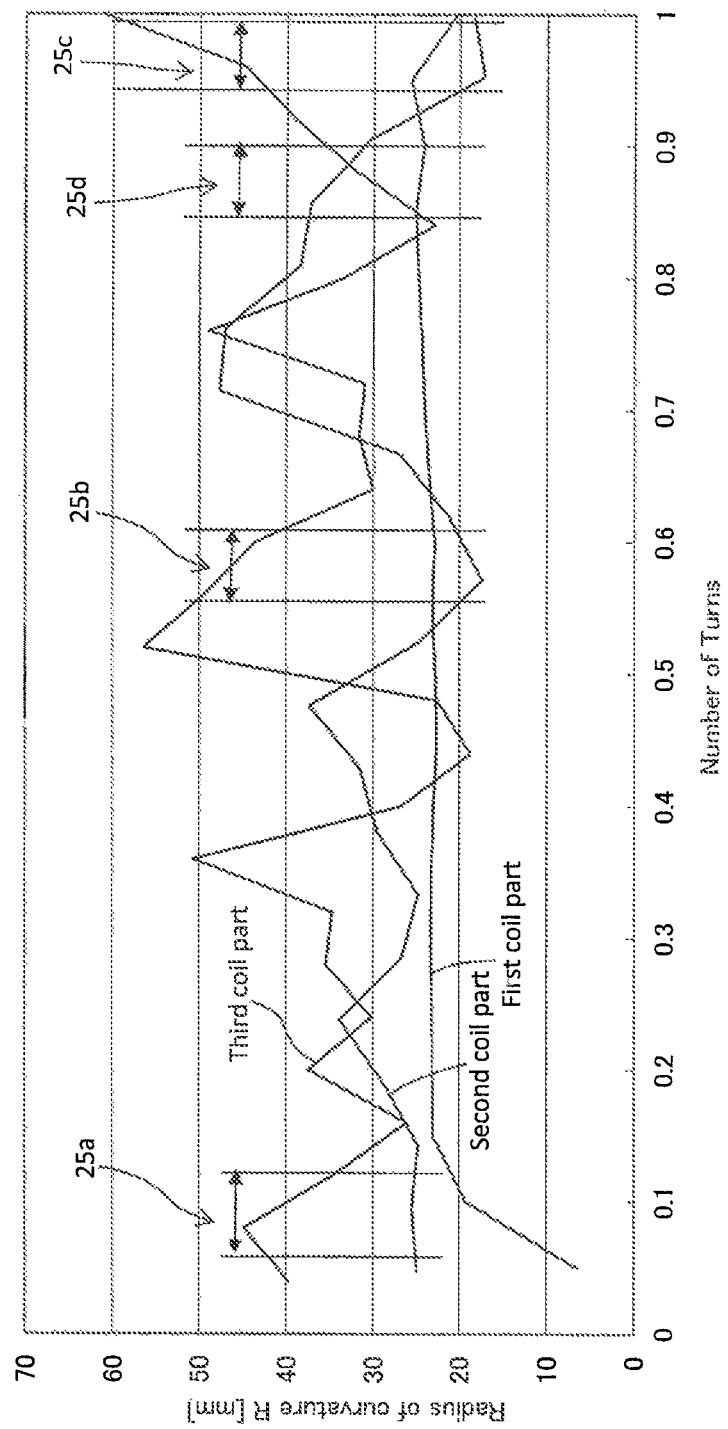
FIG. 3 is a graph showing a relationship between the number of turns and the curvature when the spiral spring shown in FIGS. 1A to 1C is in a maximum torque generating state.

FIGS. 2 and 3 show the relationship between the number of turns and the curvature when the spiral spring 1 is in an initial torque generating state (FIG. 1B) and a maximum torque generating state (FIG. 1C), respectively.

As shown in FIGS. 1A to 1C and FIGS. 2 and 3, the first movable coil part 20(1) has a plurality of small curvature parts with a smaller radius of curvature than both sides in the circumferential direction.

In the configuration depicted in the drawings, the plurality of small curvature parts include first to third small curvature parts 21a to 21c.

The first small curvature part 21a is provided in a place circumferentially spaced from the terminal end 10b of the fixed coil part 10. The second small curvature part 21b is provided in a place circumferentially spaced from the first small curvature part 21a. The third small curvature part 21c is provided in a place circumferentially spaced from the second small curvature part 21b.

As shown in FIGS. 1A to 1C and FIGS. 2 and 3, in the spiral spring 1, a first transitional area 22a and a second transitional area 22b having a larger radius of curvature than the first small curvature part 21a are provided on the starting end side and the terminal end side in the circumferential direction relative to the first small curvature part 21a, respectively.

That is, the first small curvature part 21a is located between the first and second transitional areas 22a and 22b with respect to the circumferential direction.

The second small curvature part 21b is located on the terminal end side in the circumferential direction of the second transitional area 22b, and the spiral spring 1 further includes a third transitional area 22c having a larger radius of curvature than the second small curvature part 21b on the terminal end side in the circumferential direction relative to the second small curvature part 21b.

That is, the second small curvature part 21b is located between the second and third transitional areas 22b and 22c with respect to the circumferential direction.

The third small curvature part 21c is located on the terminal end side in the circumferential direction of the third transitional area 22c, and the spiral spring 1 further includes a fourth transitional area 22d having a larger radius of curvature than the third small curvature part 21c on the terminal end side in the circumferential direction relative to the third small curvature part 21c.

That is, the third small curvature part 21c is located between the third and fourth transitional areas 22c and 22d with respect to the circumferential direction.

On the other hand, the second movable coil part 20(2) includes first to third large curvature parts 23a to 23c in places respectively corresponding to the first to third small curvature parts 21a to 21c with respect to the circumferential direction, and the first to third large curvature parts 23a to 23c each have a larger radius of curvature than both sides in the circumferential direction.

In this configuration, the first to third small curvature parts 21a to 21c comes into contact with the corresponding first to third large curvature parts 23a to 23c, respectively.

Specifically, the first small curvature part 21a comes into contact with the first large curvature part 23a while leaving a gap between the first small curvature part 21a and the fixed coil part 10, the second small curvature part 21b comes into contact with the second large curvature part 23b while leaving a gap between the second small curvature part 21b and the fixed coil part 10, and the third small curvature part 21c comes into contact with the third large curvature part 23c while leaving a gap between the third small curvature part 21c and the fixed coil part 10.

As shown in FIGS. 1A to 1C, the spiral spring 1 according to the present embodiment includes, on the terminal end side in the circumferential direction relative to the fourth transitional area 22d, a fourth small curvature part 21d having a smaller curvature than the fourth transitional area 22d, a fifth transitional area 22e having a larger curvature than the fourth small curvature part 21d, a fifth small curvature part 21e having a smaller curvature than the fifth transitional area 22e, a sixth transitional area 22f having a larger curvature than the fifth small curvature part 21e, a sixth small curvature part 21f having a smaller curvature than the sixth transitional area 22f, and a seventh transitional. area 22g having a larger curvature than the sixth small curvature part 21f, in this order.

In this configuration, the fifth to seventh transitional areas 22e to 22g serve as the first to third large curvature parts 23a to 23c, respectively.

As shown in FIGS. 1B and 1C, when the spiral spring 1 according to the present embodiment is in the elasticity retaining state, a portion Of the first movable coil part 20(1) halfway between the second and third small curvature parts 21b and 21c with respect to the circumferential direction is in contact with the fixed. coil part 10 while leaving a gap between this portion and the second movable coil part 20(2), and thereby the natural frequency is further increased.

DESCRIPTION OF THE REFERENCE NUMERALS 1 spiral spring
10 fixed coil part
20(1) first movable coil part
20(2) second movable coil part
21a to 21c first to third small curvature parts
23a to 23c first to third large curvature parts

What is claimed is:

1. A spiral spring in which an elongated member is wound into a spiral shape in substantially the same plane so as to have a fixed coil part serving as an end coil part and a plurality of movable coil parts being continuous with a terminal end of the fixed coil part,
wherein at least a first movable coil part of the plurality of movable coil parts that is in the innermost place in the radial direction does not come into contact with both the fixed coil part, which is radially adjacent inwardly, and a second movable coil part, which is radially adjacent outwardly, at the same place in the circumferential direction while coming into contact with only one of the fixed coil part and the second movable coil part in a plurality of places that are circumferentially displaced, when the spiral spring is in an elasticity retaining state reached from a free length state by elastic deformation in the diameter-reducing direction.

2. A spiral spring according to claim 1,
wherein the first movable coil part has a plurality of small curvature parts with a smaller radius of curvature than both sides in the circumferential direction,
wherein the second movable coil part has a plurality of large curvature parts that are arranged in places respectively corresponding to the plurality of small curvature parts with respect to the circumferential direction and each have a larger radius of curvature than both sides in the circumferential direction, and
wherein the plurality of small curvature parts come into contact with the corresponding large curvature parts, respectively when the spiral spring is in the elasticity retaining state.

3. A spiral spring according to claim 2,
wherein the plurality of small curvature parts includes a first small curvature part arranged in a place circumferentially spaced from the terminal end of the fixed coil part, a second small curvature part arranged in a place circumferentially spaced from the first small curvature part, and a third small curvature part arranged in a place circumferentially spaced from the second small curvature part, and
wherein the plurality of large curvature parts includes first to third large curvature parts that are arranged in places respectively corresponding to the first to third small curvature parts with respect to the circumferential direction, respectively.

4. A spiral spring according to claim 3, wherein the first movable coil part includes a halfway portion that is arranged between the second and third small curvature parts with respect to the circumferential direction and comes in contact with the fixed coil part while leaving a gap between the halfway portion and the second movable coil part, when the spiral spring is in the elasticity retaining state.

* * * * *